United States Patent Office 3,517,044
Patented June 23, 1970

3,517,044
PROCESS FOR OBTAINING THIOCAR-BAMATOHALOALKANES
Bernard Pflugfelder, Artix, France, assignor to Société Anonyme dite: Société Nationale des Petroles d'Aquitaine, a corporation of France
No Drawing. Continuation-in-part of application Ser. No. 462,719, June 9, 1965. This application Dec. 28, 1967, Ser. No. 694,072
Int. Cl. C07c *155/08;* A01n *9/12*
U.S. Cl. 260—455                                    9 Claims

ABSTRACT OF THE DISCLOSURE

A process for obtaining 1-thiocarbamato-2-monohaloalkanes by treatment of 1-thiocyanato-2-hydroxy-alkanes with an aqueous halo hydracid.

Related applications

This application is a continuation-in-part of applicant's copending application Ser. No. 462,719, filed June 9, 1965 now abandoned.

Field of the invention

The present invention is directed to the preparation of novel fungicides and insecticides, which are also useful as synthetic intermediates in the preparation of pharmaceutical products.

Description of the prior art

Heretofore 1-thiocarbamato-2-monochloroethane, has been prepared by the action of gaseous hydrochloric acid on a solution of 1-thiocyanato-2-hydroxyethane in ether (Wagner-Jauregg, Chemical Abstracts, vol. 32, p. 2940; Helvetica Chimica Acta, vol. 41, p. 377, 1958). While this method is operative on the laboratory scale, however, it is not a practical method industrially, particularly since the maximum yield obtained, being in the region of 46%, would detract from the economic feasibility of the method.

The method disclosed herein utilizes reactants which are far more readily handled in an industrial plant than those of the prior art, and moreover give rise to yields generally in the region of 63 to 70%.

Furthermore in the process of the prior art, the action of the gaseous hydracid on thiocyanatohydroxyalkane leads first to the formation of a salt of 2-imino-1, 3-oxathiolane of the acid concerned, which must then be further isomerized to prepare the desired thiocarbamato haloalkane.

Summary of the invention

The process of the present invention comprises heating a 1-thiocyanato-2-hydroxyalkane with an aqueous hydracid of sufficiently strong concentration. This method permits the preparation, not only of 1-thiocarbamato-2-chlorethane but also of an entire range of other 1-thiocarbamato-2-haloalkanes of the general formula

R—CHX—CH$_2$—S—CO—NH$_2$ where R is an alkyl radical which may have 1 to 30 and more particularly 1 to 4 carbon atoms.

It is a novel and surprising feature of the present invention, that in spite of the fact that the starting materials are known to be unstable in aqueous media, the use of strong aqueous hydracids in the process of the present invention makes possible the formation of the desired compounds not only in higher yields than heretofore possible but also in a single step directly from the starting thiocyanatohydroxyalkane.

In view of the known instability of the thiocyanohydroxyalkanes it is desirable to produce these precursors by reacting the corresponding alkene oxides with an inorganic thiocyanate in a highly acidic medium from which the thiocyanatohydroxyalkane is separated either by extraction with an organic solvent, such as chloroform or by decantation of the supernatant aqueous layer. There is thus formed an organic, or aqueous solution of the desired precursor. It is not necessary to further purify this precursor and, indeed, it is desirable to immediately react the thus prepared solution of thiocyanatohydroxyalkane with a concentrated aqueous hydracid.

The thiocarbamatohalothanes produced in accordance with the present invention are useful as pesticides more particularly as insecticides. They are effective against fungi, flies and mosquitos and may be applied with commonly utilized pesticide carriers in the form of powders, sprays, suspensions and the like.

In specific comparative tests against the known insecticide SEVIN (1-naphthyl-N-methyl carbamate), 1-thiocarbamato-2-monochloroethane and 1-thiocarbamato-2-monobromopropane against grain weevils and against bean aphids. The two test compounds had approximately the same efficacy as SEVIN.

Preferred embodiments of the invention

In the preferred embodiments of the present invention, the freshly prepared thiocyanatohydroxyalkane, for example, thiocyanatohydroxyethane, thiocyanatohydroxypropane, and thiocyanatohydroxybutane, are treated with a concentrated aqueous solution of the desired hydracid, such as hydrochloric or hydrobromic acid at temperatures of between 40 and 130° C., preferably between 60° and 120° C. It is however also within the scope of the present invention to employ hydrofluoric and hydriodic acid.

The preferred concentration of the aqueous hydracid solution utilized in this process lie in the range of 6 N to 10 N. Where hydrochloric acid is employed, the best results are obtained with solutions of a strength of approximately 8 N.

The 1-thiocarbamato-2-monohaloalkanes, generally insoluble in the acid medium in which they are prepared precipitate from this medium after cooling. The separation of the product obtained according to the new process thus consists in collecting the precipitate formed on cooling; it is generally advisable to subject this precipitate to a recrystallisation from water or optionally from an appropriate solvent.

Although the direct action of a hydracid on a thiocyanatohydroxyalkane according to the new process is particularly convenient, it is quite understood that it would not constitute a departure from the scope of the invention if first of all the thiocyanatohydroxyalkane is converted into the corresponding 2-imino-1-oxathiolane halohydrate and then this oxathiolane is heated with a concentrated hydracid.

In view of the volatility of the hydracids, the best method of operating consists in carrying out the heating with a reflux condenser; it is then possible to work at the boiling temperature of the hydracid solution.

Among the alkene oxides from which can be derived the thiocyanatohydroxyalkanes treated according to the new process, there may be particularly mentioned those of ethylene, propylene, (1,2-propylene and 1,3-propylene), 1-butene or 2-butene, and also pentenes and hexenes; they may be optionally halogenated, as for example epichlorhydrin; then the carbamato compound according to the invention contains a second halogen atom in its molecule, as there is an halogen atom in the starting thiocyanatohydroxyalkan.

In order to illustrate the invention a few non-limiting examples are given below.

EXAMPLE 1

203 ml. of 1-thiocyanato-2-hydroxyethane, $$OH-CH_2-CH_2-SCN$$

are introduced into 203 ml. of 8 N aqueous hydrochloric acid. The mixture is heated in a vessel equipped with a reflux condenser for 3 hours, at the boiling temperature of the hydrochloric acid, i.e. 113° C. After this time, the mixture is allowed to cool and the 1-thiocarbamato-2-monochlorethane Cl—$CH_2$—$CH_2$—S—CO—$NH_2$ is recovered by filtration. After drying and recrystallization from a mixture of water and alcohol, this substance is obtained in the practically pure state. The yield of the preparation is 68% with respect to the 1-thiocyanato-2-hydroxyethane which is used.

EXAMPLE 2

1-thiocyanato-2-hydroxyethane HO—$CH_2$—$CH_2$—SCN is prepared by the action of ethylene oxide on an aqueous solution of potassium thiocyanate with 10 mols. per litre, acidified to pH=1; the thiocyanathohydroxyethane which is formed is extracted with chloroform. To the 50% by weight chloroformic solution containing 256 g. of this substance, there are added 420 ml. of approximately 8 times normal hydrochloric acid, that is to say, 290 g. of HCl per litre. The mixture, which comprises two liquid phases, is heated to the boiling point of chloroform, 64° C., in an apparatus equipped with a reflux condenser. After heating for 3 hours, the mixture is allowed to cool, this causing a precipitation of 1-thiocarbamato-2-monochlorethane Cl—$CH_2$—$CH_2$—S—CO—$NH_2$. This precipitate is separated by filtration, then recrystallized from water, which leads finally to 182 g. of purified product; the yield in the preparation thereof with respect to the thiocyanatohydroxyethane used is about 53%.

EXAMPLE 3

In order to bring the initial 1-thiocyanato-2-hydroxyethane according to Example 2 to a more stable form, dry HCl gas is caused to pass at 10° C. and for 1½ hours into the chloroformic solution. The hydrochloride, which then precipitated, was 2-imino-1,3-oxathiolane hydrochloride.

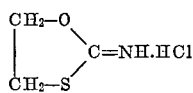

(molecular weight 139.5).

After separation, 344 g. of this substance were dissolved in 440 ml. of aqueous hydrochloric acid with 300 g. of HCl per litre and heated to the boiling point of this acid under reflux. The result of the operations was that of Example 1; 1-thiocarbamato-2-monochlorethane was obtained with a yield of 66% with respect to the initial thiocyanatohydroxyethane.

EXAMPLE 4

1-thiocyanato-2-hydroxypropane is heated for 4 hours in a boiling aqueous solution of HCl with 272 g./l. (7.5 N). 1-thiocarbamato-2-monochloropropane is formed, which crystallises after cooling, with a yield in the region of 70% relative to the initial thiocyanato compound.

EXAMPLE 5

By the action of 1,2-propylene oxide on a strongly acid aqueous solution of sodium thiocyanate, 1-thiocyanato-2-hydroxypropane was obtained, and this was extracted with benzene from its aqueous solution. The solution in benzene had added thereto its volume of aqueous 9.1 N hydrobromic acid and the mixture was heated with reflux of benzene at 80° C. for 2¾ hours. The 1-thiocarbamato-2-monobromopropane, collected after separation of the liquid phases, is formed with a yield of about 50%.

EXAMPLE 6

257 g. of 1-thiocyanato-2-hydroxyethane are dissolved in 400 ml. of aqueous hydrobromic acid having 494 g. of HBr per litre and the solution is heated to between 92 and 96° C. for 3 hours. The forming 1-thio-carbamato-2-monobromoethane Br$CH_2$—$CH_2$—S—CO—$NH_2$ is purified by recrystallization from water; it then has a melting point of 118° C. In this state of purity, it is obtained with a yield of about 63% relatively to the thiocyanato compound which is used.

EXAMPLE 7

The insecticidal action of 1-thiocarbamato-2-monochloroethane (TCMCE) and of 1-thiocarbamato-2-monobromopropane (TCMBP) was tested comparatively with the well known insecticide 1-napthyl-N-methyl carbamate ("SEVIN"). Two series of tests were carried out as follows:

(1) 10 mg. of insecticide, dissolved in acetone, were put into Petri dishes and, after the evaporation of the solvent, 100 grain weevils were put into each dish; the time taken until all the insects were in the dorsal position was determined.

(2) Vicia faba plants infested by bean aphids (*Aphis fabae*) were sprayed for 10 seconds from 50 cm, distance with 0.1% emulsion of insecticide; the number of bean aphids which fell from the plants was determined after 24 hours and expressed as % of the number of insects initially present.

RESULTS OF THE TESTS

|  | TCMCE | TCMBP | SEVIN |
| --- | --- | --- | --- |
| (1) Grain weevils (hrs.) | 5 | 4½ | 5 |
| (2) Bean aphids, percent | 75 | 74 | 78 |

I claim:
1. Method for the production of 1-thiocarbamato-2-haloalkanes which comprises mixing 1-thiocyanato-2-hydroxyalkane, the alkane group of which has from 2 to 6 carbon atoms, with an aqueous solution containing at least six equivalents of a hydracid per liter, said hydracid being selected from the group consisting of hydrochloric and hydrobromic acid, heating the mixture at a temperature of 40° to 130° C. until 1-thiocarbamato-haloalkane is formed, said halo being chloro or bromo, then recovering said thiocarbamato-haloalkane.

2. Method according to claim 1 for preparation of 1-thiocarbamato-2-haloalkane, which comprises mixing 1-thiocyanato-2-hydroxyalkane, the alkane group of which has from 2 to 6 carbon atoms, with an aqueous solution containing per liter six to ten equivalents of at least one of the hydracids hydrochloric and hydrobromic, heating the mixture at a temperature of 60° C. to 120° C. until the thiocarbamatohaloalkane is formed, then cooling the mixture and separating the thiocarbamato-haloalkane, said halo being selected from the group consisting of chloro and bromo.

3. Method according to claim 2, wherein said 1-thiocyanato-2-hydroxyalkane has a chloro substituent in the alkane group.

4. Method according to claim 2, wherein, the alkane from which derives said 1-thiocyanato-2-hydroxyalkane is ethane, the hydracid is hydrobromic acid, and the temperature is about 80° to 100° C.

5. Method according to claim 2, wherein the alkane from which derives said 1-thiocyanato-2-hydroxyalkane is propane, the hydracid is hydrobromic acid, and the temperature is in the range of about 80° C. to 100° C.

6. Method according to claim 2, wherein said 1-thiocyanato - 2 - hydroxyalkane is 1 - thiocyanato - 2 - hydroxyethane and the temperature is the boiling temperature of the hydracid solution.

7. Method according to claim 6, wherein said hydracid is hydrochloric acid and the 1-thiocarbamato-2-moochloroethane thus formed is separated by crystallization after cooling the reaction mixture.

8. Method according to claim 2, wherein said 1-thiocyanato - 2 - hydroxyalkane is 1 - thiocyanato-2-hydroxypropane and the temperature is the boiling temperature of the hydracid solution.

9. Method according to claim 8 wherein said hydracid is hydrochloric acid and the 1-thiocarbamato-2-monochloropropane thus formed is separated by crystallization after cooling the reaction mixture.

References Cited
FOREIGN PATENTS
149,427    11/1962    U.S.S.R.

OTHER REFERENCES
Wagner-Jauregg et al.: "Helva Chimica Actg." vol. 41 (1958), pp. 377–85.

CHARLES B. PARKER, Primary Examiner

D. R. PHILLIPS, Assistant Examiner

U.S. Cl. X.R.

260—454, 327; 424—300